Nov. 14, 1967     J. D. ANDREWS     3,352,958
METHOD FOR MAKING ELECTRODE HOLDER
Original Filed July 24, 1962     2 Sheets-Sheet 1
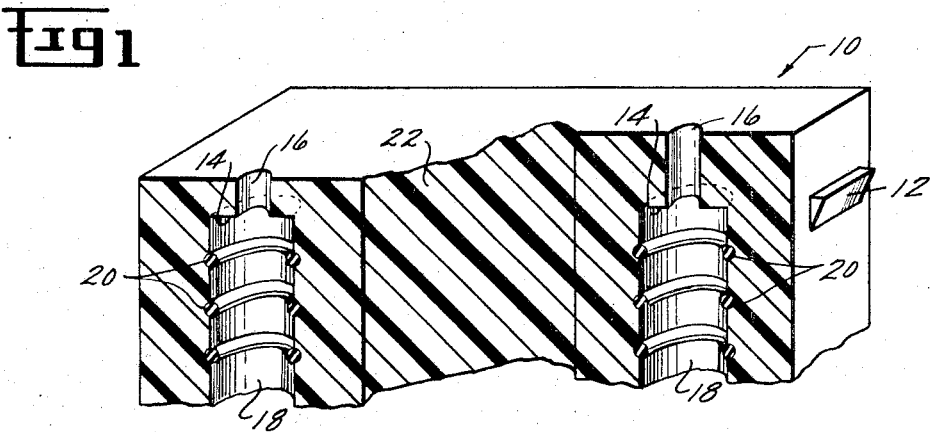
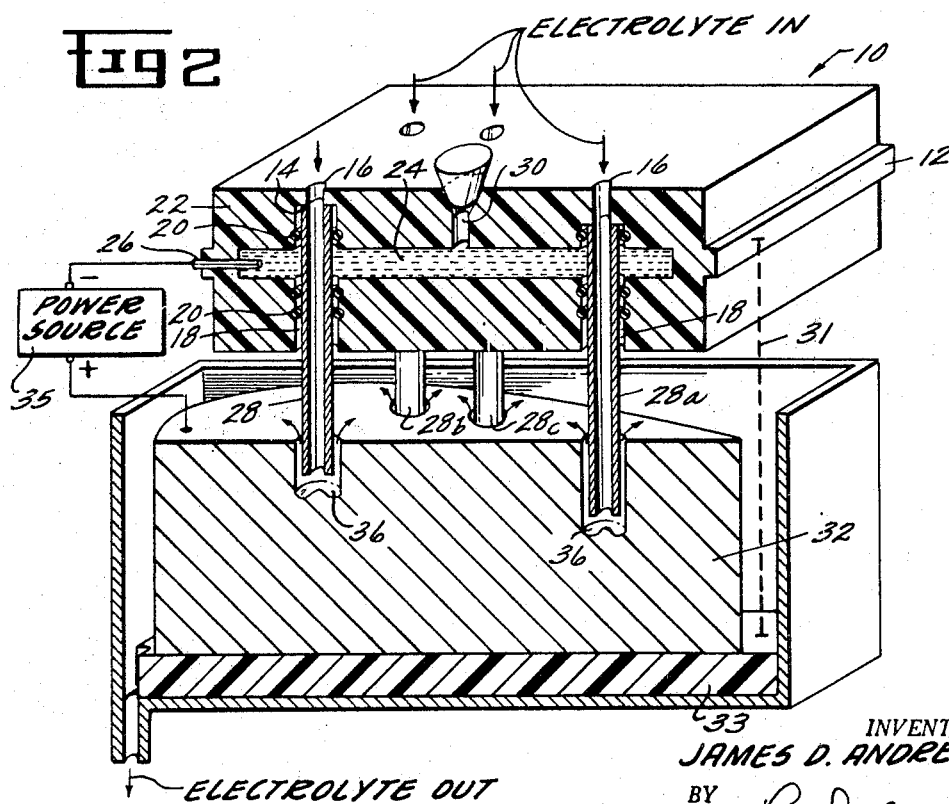
INVENTOR.
JAMES D. ANDREWS
BY
ATTORNEY

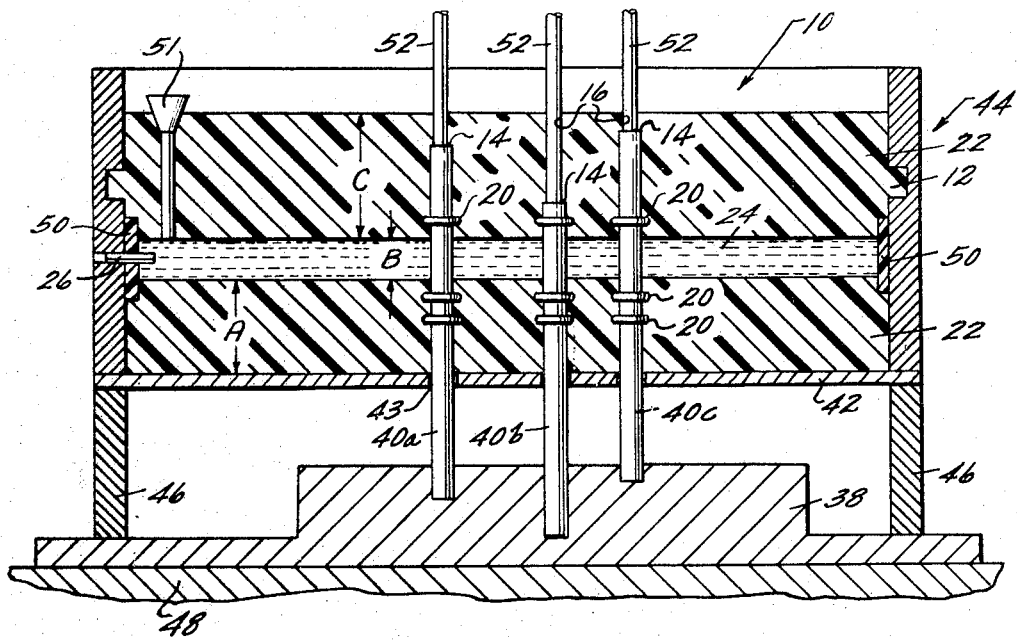

United States Patent Office 3,352,958
Patented Nov. 14, 1967

3,352,958
METHOD FOR MAKING ELECTRODE HOLDER
James D. Andrews, Cincinnati, Ohio, assignor to General Electric Company, a corporation of New York
Original application July 24, 1962, Ser. No. 211,965, now Patent No. 3,314,875, dated Apr. 18, 1967. Divided and this application Oct. 19, 1966, Ser. No. 606,478
4 Claims. (Cl. 264—255)

ABSTRACT OF THE DISCLOSURE

A method of casting a electrode holder by particularly positioning patterns and releasable electrode holding means in a casting mold, casting material and removing the patterns; the electrode holder can be cast with a liquid electrical conductor material enclosed within the holder by incremental casting.

---

This is a divisional application of Ser. No. 211,965 filed July 24, 1962 and assigned to the assignee of the present invention now Patent 3,314,875 of Apr. 18, 1967.

This invention relates to electrodes for use in electrical machining and, more particularly, to an electrode holder and method for making such a holder adapted to hold a plurality of replaceable electrodes.

Electrical machining processes, now broadly described in many prior publications, involve the use of electrodischarge or electrochemical rather than mechanical force to disengage or deplate material of a workpiece. Such proceses have led to the introduction of tools, as electrodes, of a variety of sizes and shapes used to produce multiple cavities in a workpiece. One important application of electrical machining employs grouping of electrodes each in the form of a long, small diameter rod or tube. When conductive tubes are used, an electrolyte is generally introduced through the tube to the point on the workpiece at which the electrical machining is to be performed. Long, small diameter conductive tubes are used in electrical machining processes in the manufacture of gas turbine blading to create groups of narrow, deep holes for the passage of cooling fluid. The accuracy of location from electrode to electrode, the ease of replacement of individual electrodes along with the uniformity of the current density from each electrode-tool to the workpiece are important features in reproducing uniform cavities in articles.

Prior to the present invention, groupings of long, small diameter tubes were generally embedded in an electrically conductive matrix, for example, a low melting material such as of a lead or lead-tin base, used to conduct electricity to the tubular electrodes. In other instances separate leads were attached to each of the electrodes such as by soldering and the like or each tube was held in a separate, relatively costly, fixture. The preparation of a fixture or group of fixtures for holding such a grouping of electrodes was a difficult task, especially with regard to accuracy of location of each tube and reproducibility between multiple fixtures for production use.

The problem of replacing an individual worn electrode with a new one in exactly the same location in a holder with respect to the other electrodes and in reproducing the same electrical contact with regard to conductivity was, indeed, a very difficult problem. Differences in conductivity would seriously affect reproductibility of the cavity generated from electrode to electrode by creating larger or smaller diameter holes at a given feed rate depending on the conductivity of the individual electrodes. Furthermore, the attachment of separate leads to each of the multiple electrodes was tedious, time consuming and then frequently resulted in a variation in conductivity from electrode to electrode depending on the condition of the electrode, the temperature of the joining material, etc.

It is a principal object of this invention to provide an electrode holder adapted to hold a plurality of replaceable electrodes and which includes locating means and holding means which, when a force is applied to pull an electrode from the holder, automatically releases the electrode when it is drawn from the holder whereby identical electrodes can be substituted accurately, easily and quickly one for the other.

Another object is to provide such an electrode holder which includes means to apply electrical current uniformly to each of a plurality of electrodes replaced or included in a fixture so that the electrical conductivity from electrode to electrode in the fixture or from any original electrode and its replacements is uniform.

Another object is to provide an inexpensive, relatively simple method for making such electrode holders.

These and other objects and advantages will be more readily recognized from the following more detailed description, typical examples and the drawing in which:

FIG. 1 is an isometric, sectional view of an electrode holder for two electrodes;

FIG. 2 is a partially schematic, isometric, sectional view of an electrode holder for a plurality of electrodes in operation;

FIG. 3 is a cross sectional view of the mold and pattern electrodes used in the method of making the electrode holder of FIG. 2.

Briefly, the electrode holder of the present invention comprises positioning means on the holder and internal walls which define a group of chambers to receive the electrodes. Each electrode chamber includes electrode stop means located at a predetermined position with respect to the positioning means to locate penetration of the electrode into the electrode chamber as well as electrode guide means located with respect to the positioning means and supported from the walls of the electrode chamber. Each chamber wall supports an electrode holding means which automatically releases the electrode as force is applied to withdraw the electrode from the holder. A replacement electrode is guided into position and held, during electrical machining operations, in the same position as was the electrode which it replaced.

In another form, the electrode holder of the present invention includes a second chamber connecting with the electrode chamber and designed to receive an electrical conductor which is liquid and wets the electrode at the operating temperature. In this way, contact with each electrode by the same electrical conductor is uniform from electrode to electrode, thus standardizing the conductivity.

The method form of the present invention includes the steps of locating a grouping of electrode patterns partially in a mold in a predetermined position and then casting an electrode holder around the electrode patterns. Each electrode pattern supports, at the time of casting, an electrode guide means and an automatically releasable electrode holding means which remains in and are supported by the basting when the electrode pattern is subsequently removed. The positioning of the electrode pattern with respect to other portions of the mold, upon removal of the pattern, allows formation of an electrode stop means for accurately locating the material removing end of an electrode and that of its replacements which subsequently are to be introduced into the electrode holder.

The electrode holder shown generally at 10 in FIGS. 1 and 2, includes positioning means 12, shown in FIG. 1 as a V shaped protuberance as in FIG. 2 as a protruding bar. However any outer surface on the holder which cooperates with other elements of the material removal apparatus can be used as positioning means. Such a means, however, is located on the holder in a particular position with respect to electrode stop means 14, represented as a shoulder or lip portion adjacent electrolyte inlet opening 16 to locate penetration of an electrode, such as 28 in FIG. 2, into electrode chamber 18.

Electrode chamber 18 has supported from its walls releasable electrode holding means 20 located with respect to positioning means 12 to function as guide means and to hold in position a replacement electrode. In one form, the electrode holding means 20, which functions as guide means, is a series of resilient "O" rings embedded in holder matrix 22. Such holding means holds the electrode in position in cooperation with positioning means 12, yet will release an electrode such as 28 in FIG. 2 when a force is applied to pull the electrode from the holder 10.

In a preferred form of the invention, as shown in FIG. 2, matrix 22 is electrically non-conductive. Interconnecting with each electrode chamber 18, in FIG. 2 is an electrical conductor chamber 24 including an electrical contact means such as wire 26 protruding through the wall of matrix 22 into chamber 24 in order to afford an electrical contact between a power supply and an electrical conductor subsequently held in chamber 24. The electrical conductor introduced into chamber 24 to cooperate with contact wire 26 is one which is liquid under the conditions at which the electrode holder is to operate. Thus a more uniform and more reproducible electrical contact is assured between an electrical power source and each electrode subsequently introduced into the electrode chambers. The metal mercury has been used with great success and is preferred in this application. However, other electrical conductors which can be in a liquid state during operation can be introduced into chamber 24. For example, low melting metals can be melted during operation by heat conducted through the electrode walls from heated electrolyte passing through hollow electrodes. In other cases, heating wires or rods can be included in matrix 22 adjacent chamber 24 in order to melt a low melting electrical conductor. A port means 30 can be included in the holder to provide for the introduction and removal of the liquid electrical conductor if required.

As shown in FIGS. 2 and 3, the electrode holder of the present invention can be adapted to produce cavities in different locations and of different depths depending on the relative positioning of electrodes, for example 28 and 28a in FIG. 2. When used in an electrochemical process for producing holes in a workpiece 32, such as a turbine blade, electrode holder 10 is located through its positioning means 12, which also specifically locates and directs electrodes 28, 28a, 28b and 28c. Positioning means 12 can be held by any one of a variety of well known motion producing machines shown schematically by linkage 31, to worktable 33. Linkage 31 can be a fixture on a press, programmed to produce three-dimensional motion. Workpiece 32, located on a worktable or in a holder 33, is positioned by apparatus linkage 31 with respect to the electrodes through positioning means 12. In order to bring about accurate and reproducible formation of holes in workpiece 32, a power source 35, such as a D.C. generator or a rectifier, is connected between the electrode and workpiece. For example, a negative charge is imparted through wire 26 to electrical conductor, such as mercury, in cavity 24. The charge is passed to the electrode 28 contacted by the mercury. At the same time a positive charge is impressed on the workpiece 32 so that it can become an anode and the electrode 28 can become a cathode when electrolyte is introduced between the two such as through hollow electrode 28. A bonnet or electrolyte chamber (not shown) can be used to supply electrolyte to the electrodes. Electrochemical removal of material of the workpiece progresses as the electrode and workpiece 32 are moved one toward the other to form cavities 36.

After cavities or holes of the required depth are produced, the workpiece and holder are separated and a new workpiece can then be positioned opposite the electrode holder and the electrodes. However, if one or more of the electrodes have been damaged or worn during operation, the electrode holder of the present invention allows them to be withdrawn readily from the holder and a new, replacement electrode of length and diameter the same as the original electrode to be inserted until one end contacts stop means 14. The replacement electrode, having been guided by electrode holding and guide means 20 and stopped by stop means 14, is now held in a position exactly the same as that of the original electrode.

Frequently the diameter of the electrodes are so small as not to require, during such replacement, removal of the electrical conductor, such as the mercury, in the chamber 24 because the surface tension of the liquid will restrain it from passing out as the old electrode is removed. If an electrical conductor, capable of being easily solidified is used in chamber 24, the electrode holder can be cooled in order to at least partially solidify the conductor prior to removal of the old and insertion of the new electrode. In the event the electrodes are large and the electrical conductor, as a liquid, would be discharged from chamber 24 upon removal of an electrode to be replaced, such liquid can be removed through port 30 and replaced after the reinsertion of the new electrode.

It is to be noted that the electrode holding means 20, in addition to being capable of functioning as a guide means also can function as a sealing means to prohibit the electrolyte from flowing into and mixing with the electrical conductor in chamber 24 and to prohibit the electrical conductor fluid from leaving chamber 24.

As was mentioned above, each replacement electrode is of a length and diameter the same as its respective old electrode. This allows for standardization in the manufacture of electrodes and is important in the use of the electrode holder of the present invention. Thus, as can be noted in FIGS. 1 and 2 and subsequently in the discussion with regard to the method of manufacturing as represented in FIG. 3 the electrodes can be positioned by stop means 14 at different distances from the top of the holder depending on the variation of cavity formation desired from electrode to electrode.

The electrode holder of the present invention can be made by appropriately positioning pattern electrodes which carry releasable electrode holding means. As shown in FIG. 3, such patterns are first assembled in an empty mold, shown generally at 44 and including a base plate 42. Electrodes 40a, 40b, etc. protrude through appropriately sized and located openings in base plate 42 of the mold. One end of each of the electrodes rests on a height gauge 38 which cooperates with the openings 43 in base plate 42 through which the electrodes protrude to guide the pattern electrodes into a preselected position with regard to cavities desired to be reproduced in a workpiece. Electrode patterns 40a, 40b, etc. are of identical length and diameter as their respective electrodes subsequently to be introduced in to the finished holder. Actual electrodes can be used as patterns. In selecting the size of electrodes to use, the length of each electrode is not critical so long as it and each of its replacements are all of the same length. Other electrode dimensions, however, are defined by the cavity to be produced. In this regard, the relative position of height gauge 38 and mold 44 can be adjusted, such as by supports 46 resting on table 48, to accommodate any length of electrodes thus to cooperate with mold 44 in positioning the pattern electrodes including releasable holding 20 in the proper position within the mold.

In order to afford ease of release of the pattern electrodes, or other mold inserts, from the holder after the holder is produced in the mold, it is preferable that some type of standard mold release material, many of which are commercially available, be applied to the pattern electrodes and inserts.

With the electrode patterns positioned through base plate 42 and resting on height gauge 38, as shown in FIG. 3, matrix 22, such as an uncured plastic is introduced into the mold. If it is desired to form an electrical conductor chamber such as 24 in FIG. 2, the matrix is introduced first to a height shown as A in FIG. 3 so that it covers at least one of the electrode holding means 20 which in this case are O rings functioning both as a guide and sealing means. In one particular example, the pattern electrodes were titanium tubes 12" long and had an outside diameter of 0.036" and an inside diameter of 0.023". The O rings were of a synthetic rubber sometimes referred to as "neoprene" and of inside diameter slightly smaller than the outside diameter of the patterns in order to grip the pattern firmly but releasably. The matrix introduced was a standard curable epoxy resin readily available commercially in a variety of filled and unfilled forms.

In some instances it is desirable to use the electrode holder in actual material removal operation without removing it from mold 44. However, if it is desirable to remove the electrode holder from the mold, members 50, which can be of the same material as the matrix, can be positioned in the mold in contact with the matrix material first introduced prior to its being fully hardened or can be cast to form a peripheral enclosure for chamber 24.

After the first portion A of matrix 22 has hardened, an electrical conductor in liquid form is poured over the hardened matrix to a depth B, FIG. 3, so that it is positioned between two of the electrode holding and positioning means 20 on each pattern electrode. In the example shown in FIG. 3, the two top O rings on each pattern electrode will later function as a sealing means as well. If the electrode holder is not to be removed from the mold, and if the mold is itself an electrical conductor, an electrical contact means such as wire 26 need not be included. External contact with the mold itself can be made. However, if it is intended that the holder be removed from the mold, then an electrical contact means can be positioned at a point at which it will be within the electrical conductor chamber.

Frequently the electrode patterns are hollow, as shown in FIG. 3. If it is desired to introduce electrolyte subsequently through such electrodes positioned and held by holding means 20, then, prior to pouring the final portion of matrix 22 to the depth shown by C covering the electrode patterns, FIG. 3, wires or plugs shaped to fit within each hollow electrode are positioned in the ends of the electrodes open within the mold. Such plugs extend out of the mold and are not completely covered by the matrix. The plugs in FIG. 3 were spring steel wires of about 0.021" diameter, placed within each hollow tubular electrode pattern. Port pattern 51, if required, can then be positioned in a convenient position to produce port 30 of FIG. 2. A portion of matrix 22 is then introduced to depth C in FIG. 3 and allowed to harden thus completely encasing the electrode patterns and part of the plug or wires 52.

After the matrix has been allowed to harden, the port pattern 51, the plugs 52, and the electrode patterns 40a, 40b, etc. are removed leaving an electrode holder of the type shown in FIG. 2 including a plurality of electrode chambers each having stop means 14 formed by the matrix flowing around the tops of the electrode pattern and part of plug 52. Each chamber has supported from its walls automatically releasable electrode holding means 20.

In FIG. 3, all of the electrodes are shown to be positioned in the same vertical plane for simplicity of drawing. However, it should be understood that they can be arranged at random through the horizontal plane as shown in FIG. 2 depending on the position of cavities to be generated in a workpiece. Furthermore, the electrodes have been shown as hollow tubes although it should be understood that they can be of any shape and that they need not be hollow. Appropriately shaped automatically releasable holding means, such as cast resilient plastic, can be used. The electrolyte can be introduced in a variety of ways between the workpiece and the electrode with the electrodes being held according to the present invention, although the electrode holder of the present invention is particularly useful with hollow electrodes.

The present invention has been described in connection with specific examples. However, those skilled in the arts involved will recognize the various modifications and variations of which the invention is capable.

What is claimed is:

1. A method for making an electrode holder for a plurality of replaceable electrodes comprising the steps of:
   locating a portion of each of a plurality of electrode patterns in a casting mold so that one end of each pattern protrudes from the mold and a shoulder portion of each pattern is within the mold,
   (a) each pattern being particularly positioned with respect to a portion of the mold which forms an electrode holder positioning means,
   (b) each pattern carrying within the mold an releasable electrode holding means;
   casting a material which can be solidified into a substantially rigid shape into the mold to cover each shoulder portion and electrode holding means and to form the electrode holder positioning means;
   solidifying the material into a substantially rigid form;
   and then removing the pattern electrodes to establish a plurality of electrode chambers, each the shape of its respective pattern electrode removed and each in a particular position with respect to electrode holder positioning means, each electrode chamber having supported from its walls releasable electrode holding means and having stop means formed as a result of solidifying the material around the shoulder portion of the patterns.

2. A method for making an electrode holder for a plurality of replaceable electrodes comprising the steps of:
   locating a portion of each of a plurality of electrode patterns in a casting mold so that one end of each pattern protrudes from the mold and a shoulder portion of each pattern is within the mold,
   (a) each pattern being particularly positioned with respect to a portion of the mold which forms an electrode holder positioning means,
   (b) each pattern carrying within the mold a resilient, releasable electrode holding means;
   casting a dielectric material which can be solidified into a substantially rigid shape into the mold to cover each shoulder portion and electrode holding means and to form the electrode holder positioning means;
   solidifying the dielectric material into a substantially rigid form;
   and then removing the pattern electrodes to establish a plurality of electrode chambers, each the shape of its respective electrode pattern removed and each in a particular position with respect to electrode holder positioning means, each electrode chamber having embedded in its walls resilient, releasable electrode holding means and having stop means formed as a result of solidifying the dielectric material around the shoulder portion of the patterns.

3. A method for making an electrode holder for a plurality of replaceable electrodes comprising the steps of:
   locating a portion of each of a plurality of electrode patterns in a casting mold so that one end of each pattern protrudes from the mold and a shoulder portion of each pattern is within the mold,
  (a) each pattern being particularly positioned with respect to a portion of the mold which forms an electrode holder positioning means,
  (b) each pattern carrying within the mold a plurality of resilient, releasable electrode holding means;

casting a first portion of a dielectric material which can be solidified into a substantially rigid shape into the mold to a depth to cover at least one of the plurality of electrode holding means on each electrode pattern;

solidifying the first portion of the dielectric material into a substantially rigid form;

introducing into the mold an electrical conductor in liquid form to produce an electrical conductor layer over the first portion;

casting a second portion of the dielectric material to a depth to cover the remaining electrode holding means and each shoulder portion and to form the electrode holder positioning means;

solidifying the second portion of the dielectric material into a substantially rigid form; and then removing the electrode patterns to establish a plurality of electrode chambers, each the shape of its respective electrode pattern removed and each in a particular position with respect to electrode holder positioning means, each electrode chamber having embedded in its walls releasable electrode holding means and having stop means formed as a result of solidifying the second portion of the dielectric material around the shoulder portion of the pattern, the casting of the first and second portions of the dielectric material around the liquid electrical conductor establishing an electrical conductor chamber.

4. A method for making an electrode holder for a plurality of replaceable electrodes comprising the steps of:

locating a portion of each of a plurality of hollow electrode patterns in a casting mold so that one end of each pattern protrudes from the mold and a second end portion of each pattern is within the mold,
  (a) each pattern being particularly positioned with resepct to a portion of the mold which forms an electrode holder positioning means,
  (b) each pattern carrying within the mold a plurality of resilient, releasable electrode holding means, and a plurality of liquid seal means spaced one from the other;

casting a first portion of a dielectric material which can be solidified into substantially rigid shape into the mold to a depth to cover at least one of the plurality of electrode holding means and a first liquid seal means on each electrode pattern;

solidifying the first portion of the dielectric material into a substantially rigid form;

introducing into the mold an electrical conductor in liquid form in the space between the first portion and the other of the liquid seal means;

placing in the second end portion of each pattern a removable plug which protrudes from the mold;

casting a second portion of the dielectric material to a depth covering the remaining electrode holding means, a second seal means, each second end portion and a portion of the plug within the mold and to form the electrode holder positioning means;

solidifying the second portion of the dielectric material into a substantially rigid form; and then removing the electrode patterns and the plugs to establish a plurality of electrode chambers, each the shape of its respective electrode pattern removed and each in a particular position with respect to electrode holder positioning means, each electrode chamber having embedded in its walls releasable electrode holding means, having stop means formed as a result of solidifying the second portion of the dielectric material around the second end portion of the pattern and having means to introduce electrolyte into each electrode chamber through the opening formed by the removal of each plug, the casting of the first and second portions of the dielectric material around the liquid electrical conductor establishing an electrical conductor chamber, the liquid seal means in the first and second portions confining the liquid electrical conductor in the electrical conductor chamber, the second seal means in the second portion of the dielectric material separating the electrical conductor from the electrolyte introduced into the electrode chamber.

No references cited.

ROBERT F. WHITE, *Primary Examiner.*

R. R. KUCIA, *Assistant Examiner.*